United States Patent [19]

Anand

[11] Patent Number: 5,108,683
[45] Date of Patent: Apr. 28, 1992

[54] APPARATUS AND METHOD FOR EXTRUDING SINGLE AND MULTIPLE LAYERS OF PLASTIC

[76] Inventor: Vijay Anand, 1894 Vermack Ct., Dunwoody, Ga. 30338

[21] Appl. No.: 681,558

[22] Filed: Apr. 5, 1991

[51] Int. Cl.⁵ .............................................. B29C 47/92
[52] U.S. Cl. ............................ 264/174; 264/40.7; 264/245; 425/113; 425/133.1; 425/462; 425/466; 425/145
[58] Field of Search .............. 264/174, 245, 40.7; 425/113, 114, 466, 462, 133.1, 145; 156/244.12

[56] References Cited

U.S. PATENT DOCUMENTS

| | | |
|---|---|---|
| 3,402,427 | 9/1968 | Christofas et al. ............ 425/466 |
| 3,581,343 | 6/1971 | Henrikson et al. . |
| 3,752,614 | 8/1973 | Bremer ........................ 425/466 |
| 3,758,247 | 9/1973 | Deegen ........................ 425/114 |
| 3,903,233 | 9/1975 | Dougherty . |
| 3,947,172 | 3/1976 | Myers . |
| 4,248,824 | 2/1981 | Hattop ........................ 425/462 |
| 4,280,801 | 7/1981 | Wheeler, Jr. et al. . |
| 4,303,734 | 12/1981 | Sullivan . |
| 4,495,022 | 1/1985 | Viriyayuthakorn et al. ........ 425/466 |
| 4,512,944 | 4/1985 | Astfalk et al. ................ 425/114 |
| 4,723,902 | 2/1988 | Erickson ...................... 425/466 |
| 4,770,620 | 9/1988 | Steinecke et al. .............. 425/462 |
| 4,773,954 | 9/1988 | Starnes, Jr. . |
| 4,820,927 | 6/1974 | Toomajanian . |
| 4,838,777 | 6/1989 | Weber . |
| 4,940,504 | 7/1990 | Starnes, Jr. ................... 425/113 |

FOREIGN PATENT DOCUMENTS

| | | | |
|---|---|---|---|
| 2257938 | 6/1974 | Fed. Rep. of Germany ...... 425/113 |
| 608419 | 1/1979 | Switzerland .................. 264/174 |
| 892302 | 3/1962 | United Kingdom ............. 425/114 |

Primary Examiner—Jeffery Thurlow
Attorney, Agent, or Firm—Hurt, Richardson, Garner, Todd & Cadenhead

[57] ABSTRACT

A method and apparatus for extruding single or multiple layers of plastic on an electrical conductor without having to adjust the concentricity of layers every time the tooling is changed to make different sizes.

32 Claims, 8 Drawing Sheets

APPARATUS AND METHOD FOR EXTRUDING SINGLE AND MULTIPLE LAYERS OF PLASTIC

BACKGROUND OF THE INVENTION

1. Field of the Invention

The invention relates generally to a method and apparatus for extruding single or multiple layers of plastic and specifically to a method and apparatus for extruding single or multiple layers of plastic on an electrical conductor or for forming other plastic articles without having to adjust the concentricity of layers every time the tooling is changed to make different size coatings or to coat different size wires.

2. Prior Art

Manufacturing electrical wires with single or multiple layers of plastics is a well known art. The problem encountered so far in achieving uniform coatings of plastic on the wire is in getting the plastic layers around the conductor to be concentric. So far there have been two different approaches taken to obtain concentric layers. The first approach is commonly known in the industry as an Adjustable Head. Using an Adjustable Head, every time a different product is made, one has to adjust the positions of the tip or die in relation to each other to achieve a concentric layer of plastic. This adjustment requires a skilled operator, takes up valuable production time, and while the adjustments are being made both plastic and wire is being wasted.

The second approach is commonly known in the industry as Fixed Center. In Fixed Center, one eliminates the need for adjustments by making all of the parts which guide the wire through the middle of the extruder and the plastic around it concentric and hoping this will result in concentric layers of plastic. This approach saves adjustment time and no skilled operator is needed, except one can not be sure of getting concentric layers of plastic due to the fact that, even with present technology, one can not guarantee that all the parts making up the device are suitably concentric, as there must be some tolerance in the sizes of parts which slide into each other, and the flow characteristics of different plastics is different. All of these variables result in some eccentricity of the layers of plastics and there is no means provided to make the minor adjustments.

The patent to Weber, U.S. Pat. No. 4,838,777, discloses a more or less typical adjustable head extrusion means for coating wire. In the Weber invention, the entire die base ring is adjusted relative to the extrusion support, with the entire die assembly being adjusted relative to the tip of the wire guide. One disadvantage of the Weber device is that the entire die assembly must be adjusted to create a uniform coating on the wire, thus allowing the possibility of moving the die assembly so that it is no longer coaxial with the wire guide and creating the necessity of readjusting the entire assembly as alternate dies are placed within the assembly.

The patent to Starnes, Jr., U.S. Pat. No. 4,773,954, discloses a method and apparatus for simultaneously extruding two coatings onto an electric wire. Generally, the Starnes device is configured to allow the coating of two different types of plastic on the electric wire, generally plastics with two different melting points. The Starnes device lacks an adjustment mechanism for adjusting the application of either coating and, therefore, suffers the disadvantage of possibly applying uneven coatings onto the electric wire.

The patent to Wheeler, Jr., U.S. Pat. No. 4,280,801, discloses a cross-head for an extruding device which is capable of applying multiple layers of coating to a wire. The dies for forming each layer of coating need to be adjusted relative to each other every time any of the tips or dies are changed to change the product size, therefore, having all of the disadvantages of a conventional adjustable head. Another disadvantage of the Wheeler device is the use of multiple dies, or tools, in order to apply the multiple layers of plastic on the wire. The use of multiple dies adds complexity and cost to the extruding machine and, if unadjustable or improperly adjusted, allows for the uneven coating of multiple layers on the wire. Further, if it is desired to replace one of the dies, the entire mechanism must be dismantled and readjusted upon rebuilding.

The patents to Meyers, U.S. Pat. No. 3,947,172, Dougherty, U.S. Pat. No. 3,903,233, and Toomajanian, U.S. Pat. No. 3,820,927, all disclose apparatus for applying one or more coatings to a moving wire. Each of these patents suffer the same disadvantages as those described above, namely, lack of an adjustment mechanism separate from the die and the use of multiple dies.

SUMMARY OF THE INVENTION

The present invention solves the problems resulting from the disadvantages described above by providing a means for adjusting the flow or flows of plastic coating material within the extrusion mechanism prior to and without the need for adjusting the die. Additionally, each flow may be adjusted separately and independently such that each coating, if a plurality of coatings is desired, may be applied uniformly to the wire. Further, the present invention allows the application of multiple coatings with the use of only one die, thus reducing the complexity and cost of the extrusion mechanism. By having an adjustment means separate from the die means, and by using one die, it is possible to change the die without creating a need for initial adjustment of the new die in the extrusion mechanism. Also due to the separation of the adjustment means from the die, less coating material and wire is wasted upon start up of the extrusion method and upon changing dies within the extrusion mechanism.

The present invention combines all of the benefits of a Fixed Center head, specifically not having to adjust the positions of the tip and die each time the die and/or tip is changed, with the benefits of the Adjustable Head by providing a novel means to be able to make minor adjustments whenever needed. This invention also does not have the shortcomings of an Adjustable Head or the shortcomings of a Fixed Center head as explained above. The invention combines the Adjustable Head and Fixed Center head in one head in such a way that all the parts which guide the wire through the middle of the head and the plastic around the wire remain concentric to each other and are not provided with any adjustment, resulting in the nearly concentric layers of plastic as in Fixed Center head.

The unique positioning and design of the concentricity adjusting mechanism allows adjustment to the flow of plastic when the device is put in use for the first time. After this one time adjustment, the device becomes equivalent to a Fixed Center head with all its advantages: no skilled operator required, no adjustment is needed for concentricity when different size coatings are made, large savings in production time, and less material waste.

The present invention comprises a fixed center head extrusion device with a novel coating concentricity adjustment means which, rather than adjusting the concentricity of the die relative to the tip to affect the concentricity of the plastic coating, adjusts the concentricity of the flow of molten plastic reaching the die and tip. After the molten plastic coating material is introduced to the extrusion mechanism, it travels along a predetermined path toward the die and tip where it is formed into the desired coating configuration. In the prior art fixed center head extrusion devices, neither the extrusion device nor the coating layer was adjusted for concentricity, and in the prior art adjustable head extrusion devices, the die and tip were adjusted relative to each other to attempt to make the plastic coating concentric. In the present invention, a novel concentric ring adjustment means is positioned downstream from the plastic coating entrance port, yet upstream from the extrusion die and tip, thus acting upon the plastic coating flow prior to encountering the die and tip. The plastic flow is concentrically adjusted without the need for adjusting the die and tip, thus combining the benefits of an adjustable head with the benefits of a fixed center head extrusion mechanism.

The concentric ring adjustment mechanism of the present invention can be used in a single or multiple layer extrusion mechanism. For a multiple layer extrusion mechanism, a number of concentric ring adjustment mechanism are incorporated into the extrusion mechanism. Each concentric ring adjustment mechanism is independently operable, thus allowing the adjustment of the individual coating layers upon which the mechanisms act. Further, individual layers are adjusted and combined prior to being coated on the wire, thus allowing for greater concentricity of coatings and less opportunity for air gaps to form between coating layers.

Therefore, it is an object of the present invention to provide an adjustable extrusion apparatus and method which comprises extrusion equipment capable of forming concentric single or multiple layers of plastics on an electrical conductor.

Another object of the present invention is to provide an extrusion apparatus and method which comprises extrusion equipment capable of forming single or multiple layers of coatings having uniform thicknesses.

A further object of the present invention is to provide an extrusion apparatus and method which combines the benefits of an adjustable head extrusion device with a fixed center head extrusion device, and eliminates the disadvantages of both.

A still further object of the present invention is to provide an extrusion apparatus and method which allows for the removal and replacement of the die and tip without the need for readjusting the concentricity of the flow path.

Yet another object of the present invention is to provide an extrusion apparatus and method which comprises a flow adjusting ring prior to the die and tip.

It is another object of the present invention to provide an extrusion apparatus and method in which it is unnecessary to adjust the die, tip, support body, or flow deflectors for the concentricity of the layers.

Still another object of the present invention is to provide an extrusion apparatus and method which comprises a plurality of flow adjusting rings in the molten plastic flow paths to adjust the flow of plastics without altering the concentric position of the tip or die in relation to the main body or flow deflectors.

Another object of the present invention is to provide a multi-layer extrusion apparatus and method which comprises means to position a first plastic flow adjusting ring and utilizing part of it as a flow deflector for a second plastic flow.

Yet another object of the present invention is to provide an extrusion apparatus and method which comprises means to position a second adjusting ring at the exit end of the support body by a concentric die holder retainer.

A further object of the present invention is to provide an extrusion apparatus and method which comprises a unique positioning of a port through the main body and the flow deflector reaching the tip which can be utilized for various applications, for example, a third thin layer of plastic, inner color stripes, vacuum operation, or pressured air or liquid injection.

It is another object of the present invention to provide an extrusion apparatus and method which can be used either for pressure extrusion or tubing extrusion by simply changing the tip and die design.

Another object of the present invention is to provide an extrusion apparatus and method which, besides extruding plastic on electrical wire, also can extrude tubing, pipes, hoses or plastic.

Still another object of the present invention is to provide an extrusion apparatus and method which can be incorporated into many of the existing heads in the industry by modifying a few parts, thus eliminating the need for a complete new apparatus, reducing both apparatus and product manufacturing costs, and increasing efficiency and simplicity of apparatus design and operation and of product production.

These objects and other objects, features and advantages of the present invention will become apparent to one skilled in the art when the following Detailed Description of a Preferred Embodiment is read in conjunction with the attached figures, in which like reference numerals correspond to like parts throughout the several views.

BRIEF DESCRIPTION OF DRAWINGS

FIG. 3 are perspective views of embodiments of second flow deflectors for a second coating of plastic, with FIG. 3a allowing a full second coating, FIG. 3b allowing one external stripe, FIG. 3c allowing a plurality of stripes, and FIG. 3d blocking the flow of the second coating.

FIG. 4 are perspective views of embodiments of the tips used to allow a third coating layer, with FIG. 4a allowing a full third coating layer, FIG. 4b allowing one internal color stripe, FIG. 4c allowing a plurality of internal color stripes, and FIG. 4d blocking the flow of the third coating.

DETAILED DESCRIPTION OF A PREFERRED EMBODIMENT

Figure 1:
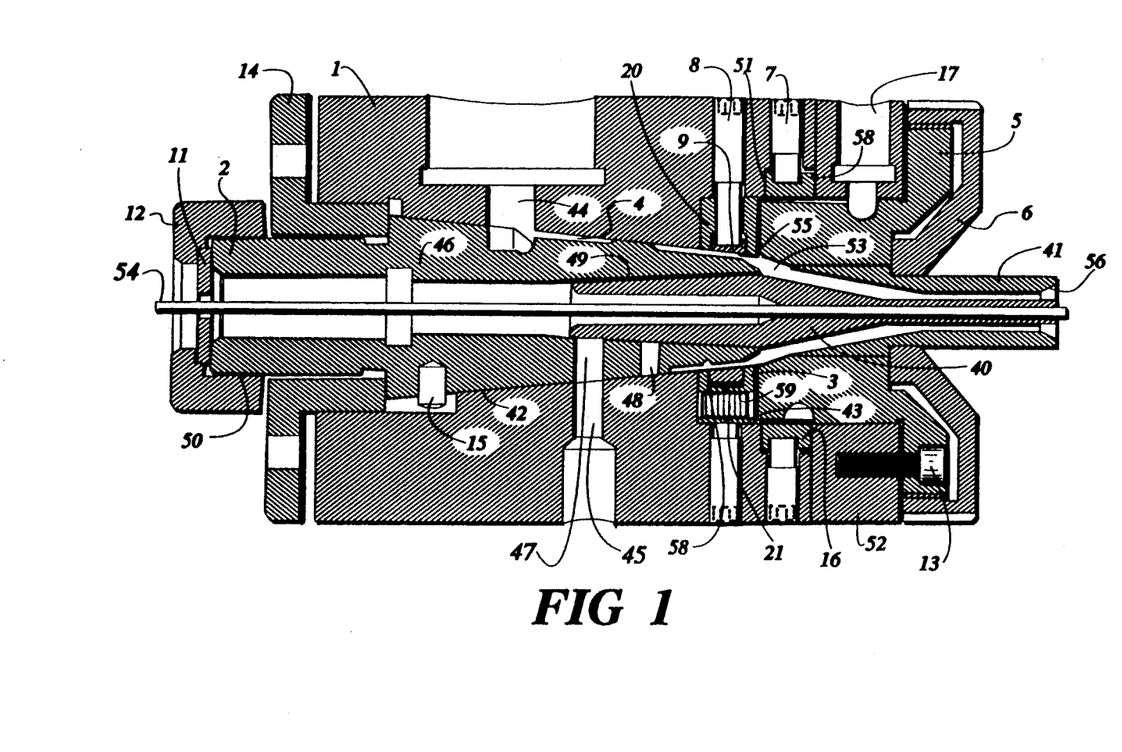
FIG. 1 is a cross-sectional view of a preferred embodiment of the present invention.

Referring now to FIG. 1, a preferred embodiment of the present invention is shown which is configured to allow the application of three different full tubular coatings onto a wire substrate. The cross head 10 comprises a main body 1 which is a tubular component having a transverse orientation coaxial to the feed axis of a metal wire 54 being supplied to the cross head 10 for coating. The main body 1 has three concentric bores, first bore 42, second bore 43, and third bore 51, transversely oriented coaxial to each other and axially along the center of the main body 1. First bore 42 is generally tapered from the wire 54 entrance or upstream end of main body 1 toward the coating or downstream end of main body 1. Second bore 43 has a generally constant diameter which is somewhat greater then the diameter of the downstream end of first bore 42 and which is located immediately adjacent to and downstream from first bore 42. Third bore 51 also has a generally constant diameter and is located immediately adjacent to and downstream from second bore 43.

First flow deflector 2 is a generally tubular component which has a generally cylindrical upstream end and a generally frustro-conical downstream end 46 intergrally attached to the upstream end. The external configuration of the downstream end 46 is complimentary to the configuration of first bore 42 such that first flow deflector 2 can be fitted within first bore 42 of the main body 1 in a transverse orientation. The first flow deflector 2 is fitted within the first bore 42 of main body 1 and fixed by means of first flow deflector nut 14 to the main body 1. A wire guide 11 is fitted on the upstream end of first flow deflector 2 and is fixed by means of wire guide nut 12 cooperating with screw thread 50.

The downstream end 46 of first flow deflector 2 has a generally tapered bore which tapers in the opposite direction of first bore 42. A tip 40 is fitted within tapered bore 49 and fixed by means of a pin (not shown) inserted in pin hole 48 through the downstream end 46 of first flow deflector 2 in an orientation normal to the access of first flow deflector 2. Tip 40 is a generally tubular component having a tapered upstream end which cooperates with tapered bore 49, a generally frustro-conical central portion, and a generally cylindrical downstream portion. Located along the axis of tip 40 is a central bore through which wire 54 is guided during the wire coating process. The bore through the upstream end of tip 40 generally is somewhat larger in diameter than the wire 54, and gradually narrows toward the central portion of tip 40 to a diameter generally slightly greater than the diameter of the wire 54. The bore of tip 40 then remains constant along the central portion and the downstream portion of tip 40.

The downstream end of first flow deflector 2 extends into the second bore 43 a short distance. Second bore 43 houses the novel concentric ring flow adjustment assembly which is located generally concentric and cooperates with the downstream end of first flow deflector 2 extending into first flow bore 43. The flow adjustment assembly comprises upstream first plate 20, downstream second plate 3, and first flow adjusting ring 9 located between first plate 20 and second plate 3. Plates 20 and 3 are generally flat, washer-like structures concentric with each other and with the main body 1 and having central opening inner perimetal surfaces corresponding with the extended tapered shape of first bore 42. Plate 20 comprises a downstream extending ridge 58 which cooperates with an upstream extending ridge 59 located on plate 3 to form a generally empty space between first plate 20 and second plate 3 in which first flow adjusting ring 9 is located. First flow adjusting ring 9 also has an inner perimetal surface which corresponds to the extension of the taper of first bore 42 and which adjusts the concentricity of flow of a first plastic coating material. First flow adjusting ring 9 can be positioned within the cross head 10 by manipulating first adjustment bolts 8. Typically, there are four first adjustment bolts 8 fitted radially in threaded holes through main body 1, the ends of which press against the outer perimetal surface of first flow adjusting ring 9 and which are oriented typically at 90° angles from one another around first flow adjusting ring 9. First adjustment bolts 8 make it possible to adjust first flow adjusting ring 9 relative to the flow path of the first coating plastic to create a uniform first coating as described below. Plates 20 and 3 are fixed relative to each other by means of plate fixing bolt 21.

Third bore 51 houses a second concentric ring flow adjustment assembly similar in configuration and operation to the first concentric ring flow adjustment assembly described above. Second concentric ring flow adjustment assembly comprises second flow adjusting ring 16 having a generally constant inner perimetal surface which adjusts the concentricity of a flow of a second plastic coating material. Second flow adjusting ring 16 can be adjusted by manipulating second adjustment bolt 7. Generally, there are four second adjustment bolts 7 fitted radially in threaded holes through main body 1, the ends of which press against the outer perimetal surface of second flow adjusting flow ring 16 and which are oriented generally at 90° angles from one another around second flow adjusting ring 16. Second adjustment bolts 7 make it possible to adjust second flow adjusting ring 16 relative to the flow path of the second coating plastic to create a uniform second coating as described below. Second flow adjusting ring 16 is retained within the third bore 51 by second layer body 52, both of which are generally concentric to main body 1.

Second flow deflector 5 is a generally tubular component fixed in a transverse orientation within third bore 51 within the hollow central portions of second flow adjusting ring 16 and second layer body 52. When second flow deflector 5 is fitted within third bore 51, a second layer annulizer space 55 is created between the outer perimetal surface of second flow deflector 5 and the inner perimetal surfaces of second flow adjusting ring 16 and second layer body 52, and between the upstream edge of second flow deflector 5 and the downstream side of second plate 3. Second layer annulizer space 55 allows the second coating layer plastic to travel from second plastic entrance port 17 through the second layer annulizer space 55 past flow adjusting ring 16 and into the annular space 53 during the coating process described below. The second flow deflector 5 is fixed within third bore 51 by means of second flow deflector bolts 13 passing through second flow deflector 5 and being threaded into second layer body 52.

Die 41 is a generally tubular component fixed in a transverse orientation and coaxial with the main body 1. Die 41 is located at the downstream end of the main body and generally surrounds the central portion and downstream portion of tip 40. Die 41 has a bore which has a diameter somewhat greater than the outer diameter of the central portion and downstream portion of tip 40, and has a shape generally complimentary to the central portion and downstream portion of tip 40 so as to form annular space 53 between the inner perimetal surface of die 41 and the outer perimetal surface of the central portion and downstream portion of tip 40. That is, die 41 has an upstream bore which has a taper corresponding to the frustro-conical shape of the central portion tip 40, and a downstream bore which is generally cylindrical corresponding to the downstream portion of tip 40. Die 41 is fixed within the central bore of second flow deflector 5 by means of die nut 6 The downstream end of die 41 comprises exit end 56 through which the plastic coating or coatings are extruded during the coating operations so as to coat wire 54.

The plastic for forming the first coating enters the cross head 10 through first plastic entrance port 44 and encounters first flow deflector 2. First flow deflector 2 diverts the flow of the first plastic and directs the first plastic around the periphery of first flow deflector 2 in a downstream direction toward annular space 53. BY the time the first plastic flow reaches annular space 53, it has been forced all the way around the downstream end 46 of the first flow deflector 2 thus creating a tubular flow of first plastic. The first concentric ring flow adjustment assembly comprising first flow adjusting ring 9 then acts upon the first plastic flow as described in more detail below.

The second plastic for forming the second coating enters the cross head 10 through second plastic entrance port 17 and encounters second flow deflector 5. Second flow deflector 5 forces the second plastic flow in an upstream direction into second layer annulizer space 55 toward annular space 53. By the time the second plastic flow reaches annular space 53, it has been forced all the way around second flow deflector 5 and enters annular space 53 in the form of a concentric tube. The second concentric ring flow adjustment assembly comprising second flow adjusting ring 16 acts upon the second plastic flow prior to it reaching annular space 53. The second plastic forms a second coating layer outside of the first coating layer. Various configurations for second flow deflector 5 are shown in FIG. 3 and discussed below.

The third plastic for forming a third coating layer enters the cross head 10 through third plastic entrance port 45 and travels through first flow deflector 2 through third layer port 47 The third plastic flow then encounters the outer periphery of the upstream portion of tip 40 which acts as the third flow deflector. The third plastic flow is forced all the way around the outer periphery of the upstream end of the tip 40 in a downstream direction toward annular space 53. By the time the third plastic flow reaches annular space 53, it is moving in the form of a concentric tube. As the third layer is generally a very thin layer, no concentric ring adjustment assembly is necessary, although a third concentric ring adjustment assembly can be incorporated into the cross head 10 if desired. The third coating generally is the innermost coating of the three coating layers. Various configurations for the third flow deflector are shown in FIG. 4 and discussed below.

Figure 2A:
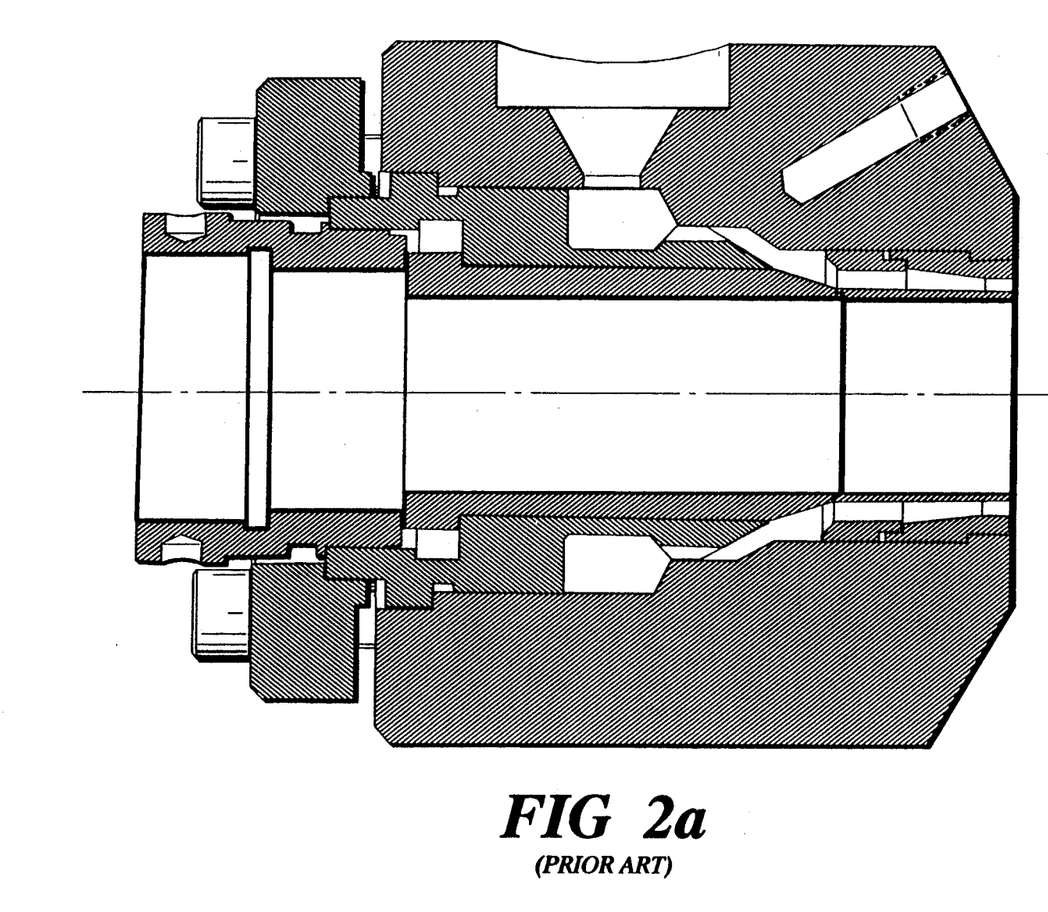
FIG. 2a is a cross-sectional view of a fixed center head extrusion device found in the prior art.

Referring now to FIG. 2a, a prior art fixed center head extruder is shown. This fixed center head extruder is configured for a one coating design. The plastic to make the first coating is introduced to the extruder as discussed above and is extruded to coat the substrate. This extruder has no adjustment mechanism and the concentricity of the coating is determined by the positioning of and tolerance between the various component parts and the design of the flow deflector 2.

Figure 2B:
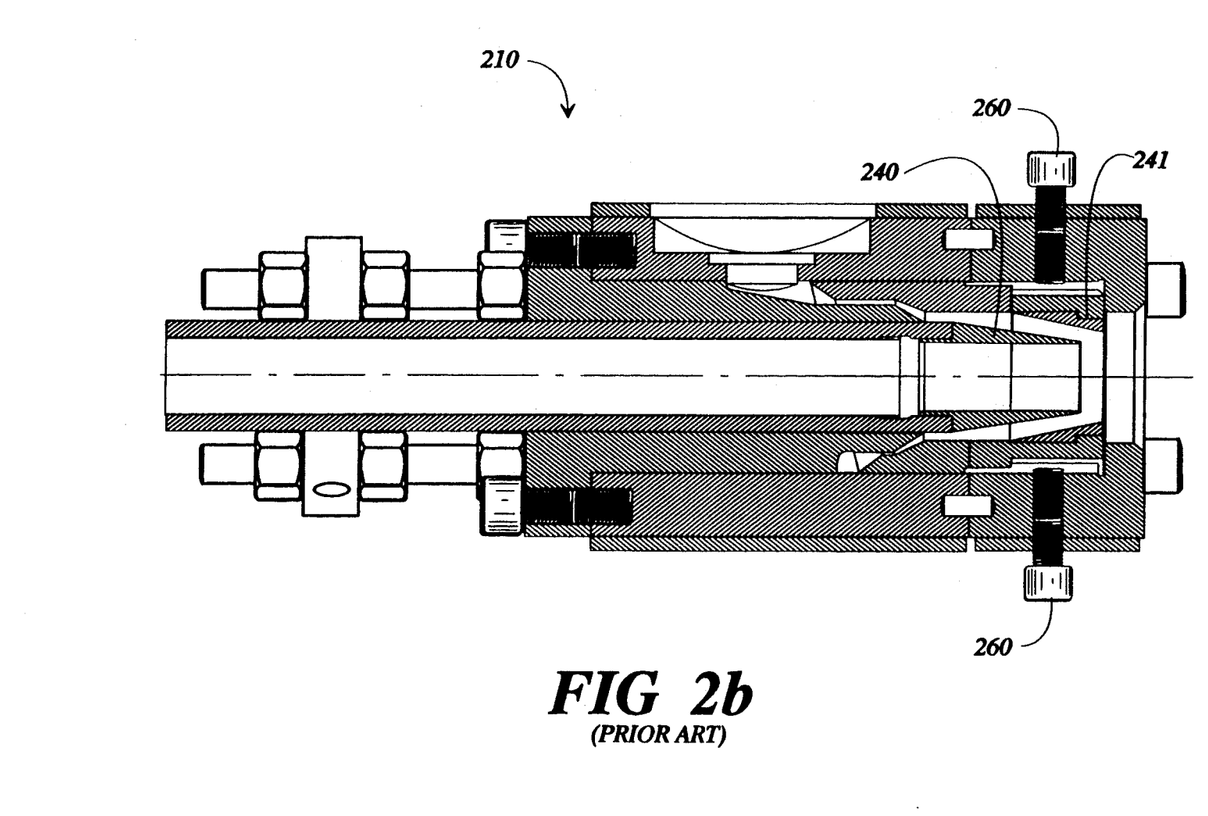
FIG. 2b is a cross-sectional view of an adjustable head extrusion device found in the prior art.
Figure 3A:
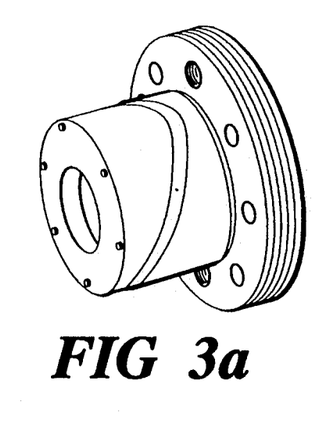
Figure 3B:
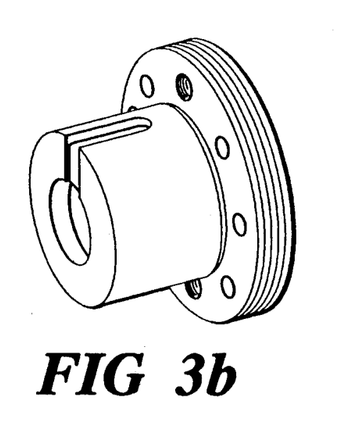
Figure 3C:
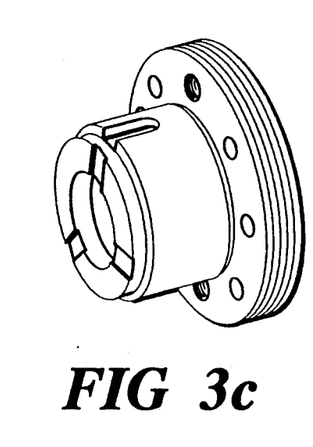
Figure 3D:
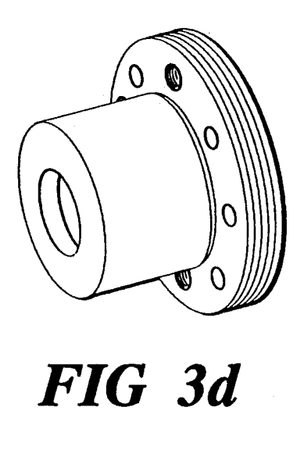

FIG. 2b shows a typical prior art adjustable cross head configured for coating a single layer on the substrate. The concentricity of the plastic coating is adjusted by adjusting the positioning of the die 241 relative to the tip 240 by manipulating adjusting bolts 260. As is obvious, if the manufacture desires to substitute a second die 241 and tip 240 in the cross head 210 it may be necessary to readjust the new die 241 relative to the new tip 240 prior to operating the extrusion process. For example, assuming new die 241 has a bore with a diameter smaller than that of the old die 241, if the old die 241 had been set somewhat off-center relative to the tip 240, the bore of the new die 241 may contact the outer edge of the tip 240 upon insertion, and such contact may damage either or both the die 241 and tip 240, and would prevent the plastic from creating a concentric layer. By moving the concentricity adjustment mechanism from around the die 241, the present invention eliminates this obvious disadvantage.

Referring now to FIG. 3, various example designs for the second flow deflector 5 are shown. The design shown in FIG. 3a is configured to force the flow of the second plastic all the way around the second flow deflector 5 thus creating a tubular second layer. The design of the second flow deflector 5 shown in FIG. 3b is configured to create a flow of the second plastic resulting in one stripe of the second plastic being deposited on the first coating in an axial direction. The flow created by the second flow deflector 5 shown in FIG. 3b does not create a complete coating. The second flow deflector 5 shown in FIG. 3c is configured to create multiple stripes of the second coating on the first coating. Similar to the second flow deflector 5 shown in FIG. 3b, the second flow deflector 5 shown in FIG. 3c creates a multiple of stripes axially along the outside of the first coating. The second flow deflector 5 shown in FIG. 3c does not create a complete coating. The second flow deflector 5 shown in FIG. 3d blocks entrance of the second plastic into the cross head 10. When the second plastic enters the cross head 10 through second plastic entrance port 17, it encounters the solid outer perimeter of the second flow deflector 5 shown in FIG. 3d and cannot travel through the second layer annulizer space 55 into the annular space 53. The second flow deflector 5 shown in FIG. 3d is used when the second coating is not desired.

Figure 4A:
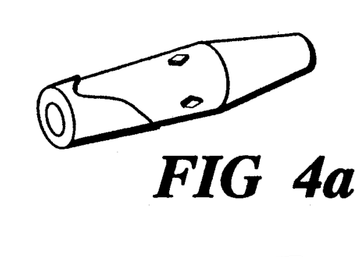
Figure 4B:
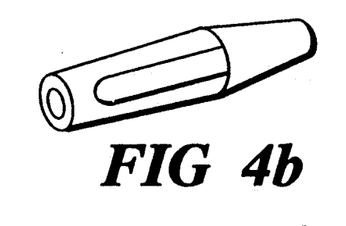
Figures 4C, 4D:
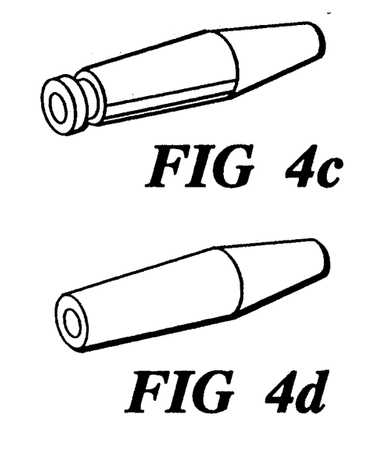

Referring now to FIG. 4, different configurations for the outer periphery of the upstream portion of tip 40 are shown. As discussed above in connection with the second flow deflector 5, various designs of the outer periphery of the upstream portion of tip 40 create different third layer coating configurations. In this embodiment, the third layer is the innermost layer. The configuration shown in FIG. 4a allows for a complete, tubular, third layer coating on the wire. The configuration shown in FIG. 4b allows for one stripe of third layer coating plastic to be deposited on the wire 54. The configuration shown in FIG. 4c allows for a plurality of stripes of the third layer coating material to be deposited on the wire 54. The configuration shown in FIG. 4d blocks entrance of the third layer coating material thus resulting in no third layer coating. The stripe configurations shown in FIGS. 3b, 3c, 4b, and 4c typically are used for color marking various types of wire.

Figure 5:
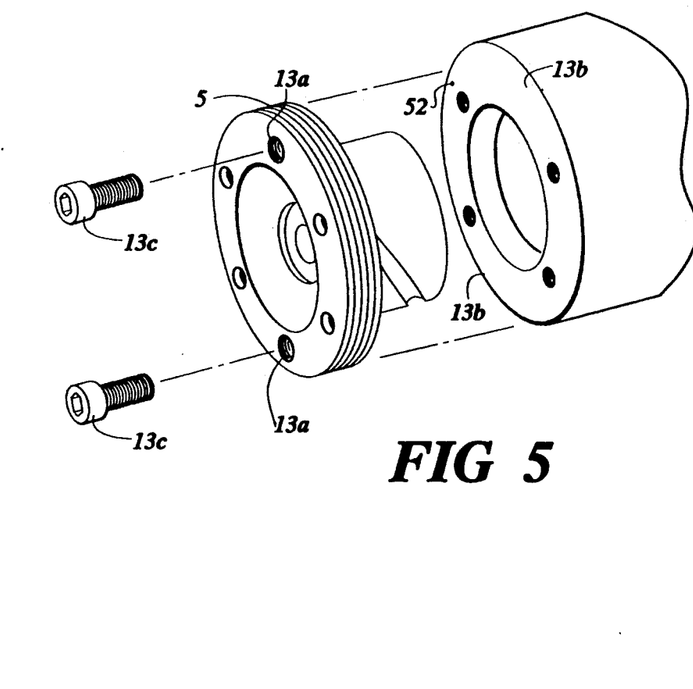
FIG. 5 is a perspective view of the means for removing the second flow deflector shown in FIG. 3 from the extrusion device.

FIG. 5 shows a means for removing the second flow deflector 5 from the second layer body 52. Removal bolts 13c are passed through bolt holes 13a in second flow deflector 5 touching at 13b of second layer body 52, thus forcing second flow deflector 5 away from second layer body 52. Thus, second flow deflector 5 can be easily removed.

Figure 6:
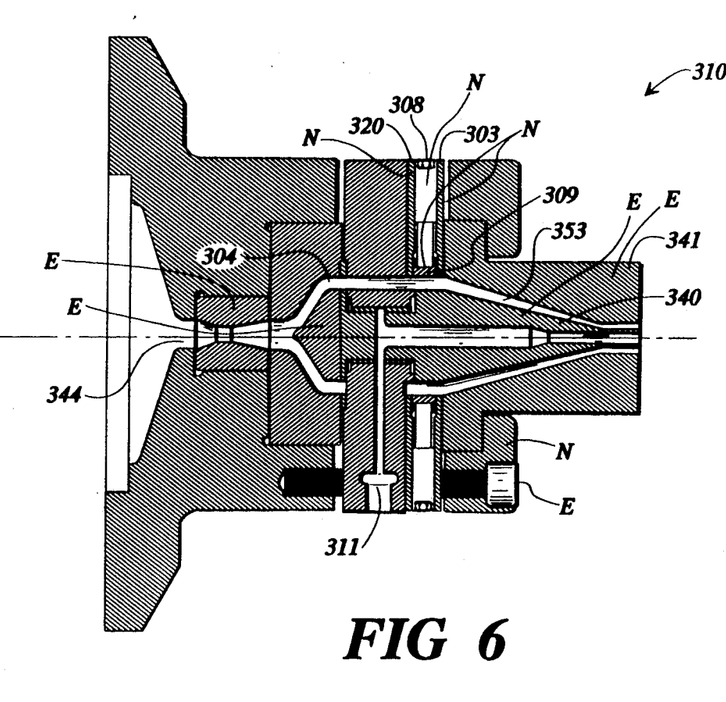
FIG. 6 is a cross-sectional view of an inline head with the present invention configured for concentric introduction of a single coating layer.

FIG. 6 shows the concentric ring adjustment assembly of the present invention retrofitted to a typical inline head 310. Existing components of the inline head 310 are indicated by the reference letters E, while the new components of the concentric ring adjustment assembly of the present invention are indicated by the reference letters N. This type of head is used for making tubes, pipes or hoses. The plastic is fed into the head 310 through plastic entrance port 344 and is diverted into a concentric tubular flow in the plastic layer annulizer space 304. The plastic then travels through annular space 353 where it is formed into the proper coating configuration by traveling between tip 340 and die 341. Pressurized air or liquid is introduced through port 311 to ensure that the formed tube remains tubular. The concentric ring adjustment assembly is located upstream from the annular space 353 and comprises first plate 320, second plate 303, flow adjusting ring 309, and adjustment bolts 308. By manipulating the flow adjustment bolts 308 as described above, the concentricity of the plastic flow is adjusted prior to extrusion between tip 340 and die 341. By retrofitting the concentric ring adjustment assembly to an inline fixed center head extruder, a simple and effective means for improving the concentricity of the coating is achieved.

Figure 7:
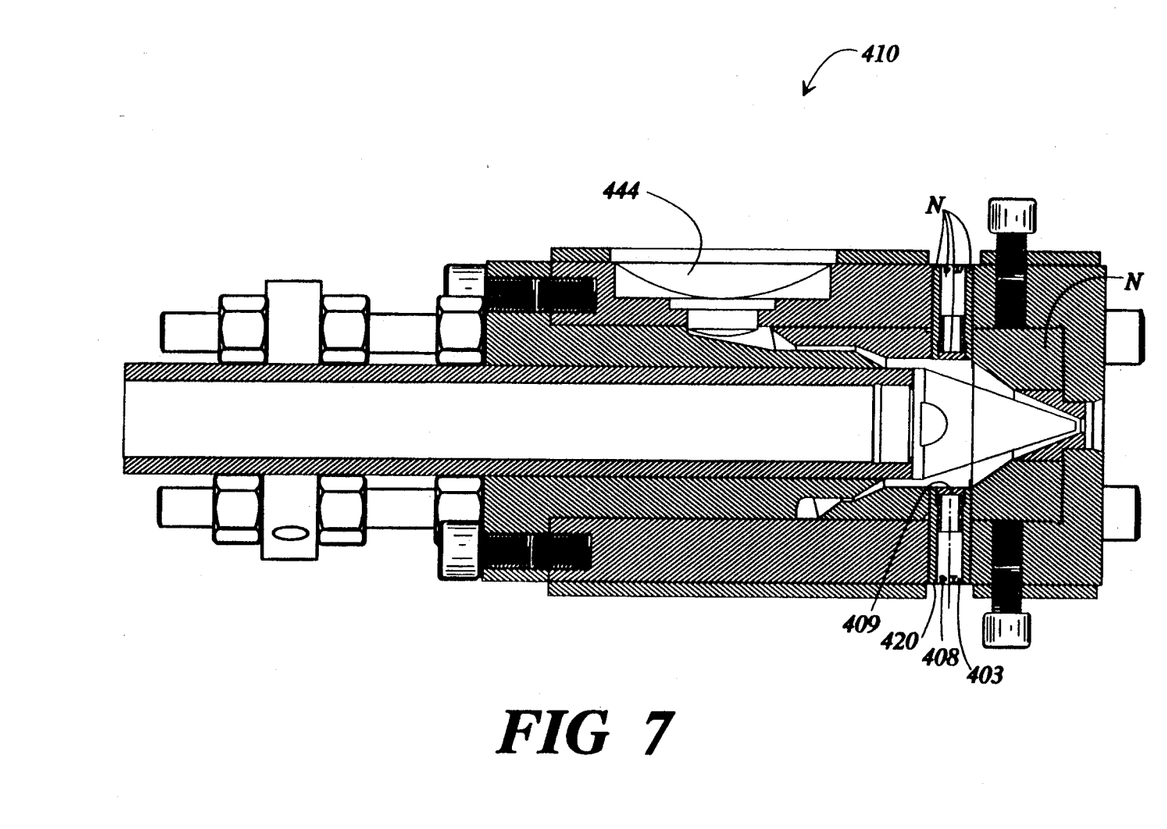
FIG. 7 is a cross-sectional view of an embodiment of the present invention incorporated onto a prior art adjustable center head extrusion mechanism.

FIG. 7 shows the concentric ring adjustment assembly of the present invention retrofitted to a typical adjustable center head 410. Plastic material enters the cross head 410 through a side port 444. The various components added by the retrofit are indicated by the reference letter N and comprise first plate 420, second plate 403, flow adjusting ring 409, and adjustment bolt 408. The concentric ring adjustment assembly has the same general operation as discussed in the description of the preferred embodiment.

Figure 8:
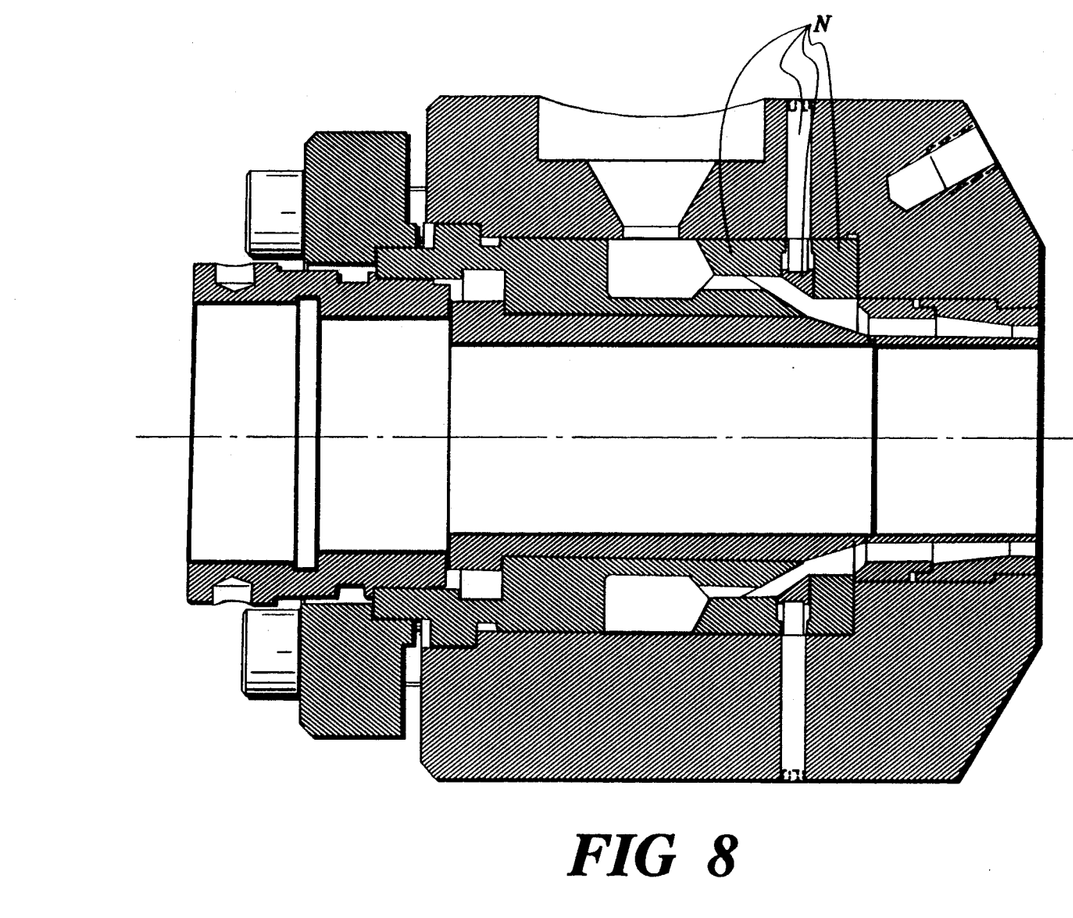
FIG. 8 is a cross-sectional view of an embodiment of the present invention incorporated onto a fixed center cross head plastic extrusion device.

FIG. 8 shows the concentric ring adjustment assembly of the present invention retrofitted to a typical fixed center cross head plastic extrusion device. By retrofitting the concentric ring adjustment assembly of the present invention to such an extrusion device, minor adjustment can be made to the flow of the plastic to improve the concentricity without losing the efficiency of the fixed center head.

Figure 9:
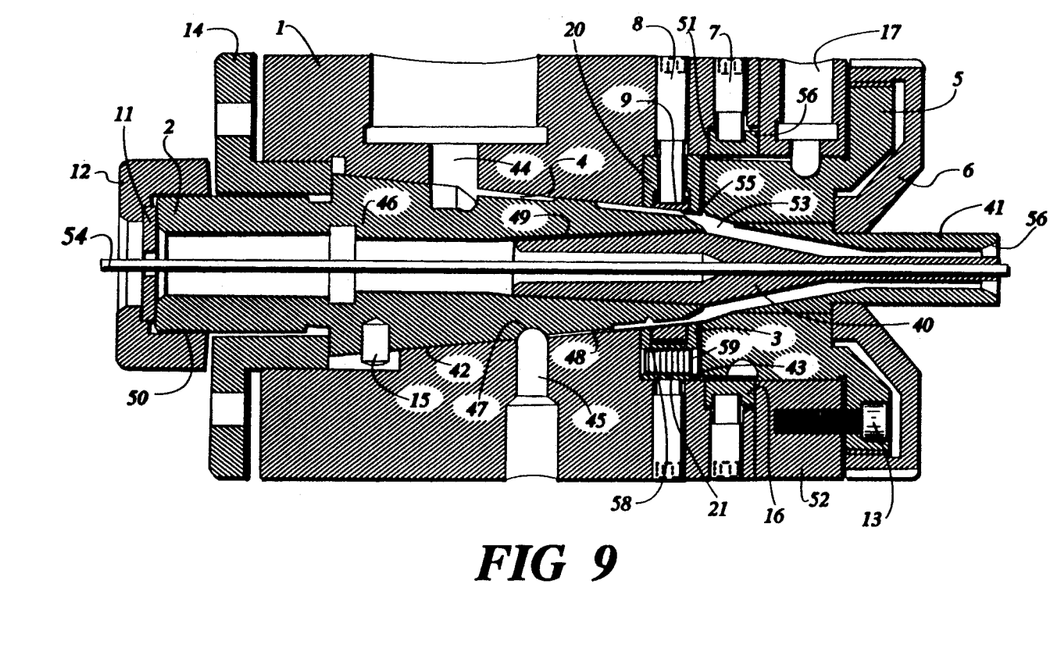
FIG. 9 is a cross-sectional view of an embodiment of the present invention which produces a center layer color stripe.

FIG. 9 shows an alternate embodiment of the preferred embodiment shown in FIG. 1 which is configured to allow the application of two full tubular coatings with a third coating in the form of a stripe sandwiched between the two full coatings. In this embodiment, the plastic for forming the sandwiched stripe corresponds to the plastic for forming the first coating described above. First flow deflector 2 is configured to allow a striped flow of a first plastic. The third plastic, which forms the innermost layer, enters the cross head 10 through third plastic entrance port and encounters first flow deflector 2. The third plastic flow is forced all the way around the outer periphery of first flow deflector 2 so as to form a third coating layer in the form a a concentric tube. The first plastic material is then deposited in a striped flow on the outside of the third coating layer. The cross head 10 then operates similarly to the above description.

OPERATION OF A PREFERRED EMBODIMENT

The operation of the cross head 10 will be explained for an embodiment having the capability of extruding three separate layers on a wire using a side entrance port design. The same description of operation is applicable to devices having the capability of coating from one to three or more layers into a variety of different extruder head configurations, such as the inline head shown in FIG. 6.

Referring now to FIG. 1, the wire 54 to be coated travels through the cross head 10 from the upstream end of the cross head 10, defined generally by the wire guide 11 and wire guide nut 12, through the central bore of the cross head 10, defined generally by the central bores of first flow deflector 2 and tip 40, and out of the downstream end of the cross head 10, defined generally by exit end 56. Wire guide 11 guides the wire 54 in a generally central axial position into cross head 10 until wire 54 enters the bore of the central portion and downstream portion of the tip 40, which bore is generally slightly greater than the diameter of wire 54. Wire 54 is generally continuous, such as being unwound from a reel or spool upstream from cross head 10.

The first plastic coating material enters the cross head 10 in a molten state through first plastic entrance port 44 and encounters first flow deflector 2. First flow deflector 2 diverts the flow of the first plastic coating material both in a direction circumferentially around first flow deflector 2 and in a downstream direction, and generally equalizes the pressure of the flow of the first plastic coating material as it flows through first layer annulizer 4 toward the tip 40 and the die 41. The configuration of the outer perimetal surface of the first flow deflector 2 is such that the first plastic coating material is forced all the way around the first flow deflector 2 so that when the first plastic coating material reaches annular space 53, it is moving in a tubular form along the axis of the cross head 10 in a fairly uniform flow.

As the first plastic coating material reaches the downstream end of first flow deflector 2, the first plastic coating material encounters the first concentric ring adjustment assembly which has been adjusted so as to create a uniform, concentric, consistent thickness flow of first plastic coating material, as described herein. If it is determined that the first layer coating is not concentric, that is, does not have a uniform radial wall thickness, the first concentric ring adjustment mechanism is adjusted relative to the central axis of the cross head 10 by means of first adjustment bolts 8. For example, if the lower quadrant wall thickness of the first layer coating is thicker than the upper three quadrants of the first layer coating, the lowermost first adjustment bolt or bolts 8 are manipulated such that first flow adjusting ring 9 is raised relative to the cross head 10 thus, in effect, squeezing or constricting the flow of first plastic coating material axially along the lower quadrant of first flow deflector 2, while allowing more of first plastic coating material to flow axially along the other three quadrants of first flow deflector 2. This adjustment results in a thinning of the first coating layer along the lowermost quadrant and a concomitant thickening of the first coating layer along the upper three quadrants. Therefore, when the tubular flow of first plastic coating material reaches annular space 53 after passing the first concentric ring adjustment mechanism, it is generally concentric and of uniform thickness.

Concurrently, the second plastic coating material enters the cross head 10 in a molten state through second plastic entrance port 17 and encounters second flow deflector 5. Second flow deflector 5 diverts the flow of the second plastic coating material both in a direction circumferentially around second flow deflector 5 and in an upstream direction, and generally equalizes the pressure of the flow of the second plastic coating material as it flows through second layer annulizer 55. The configuration of the outer perimetal surface of the second flow deflector 5 is such that the second plastic coating material is forced all the way around the second flow deflector 5 so that when the second plastic coating material reaches annular space 53, it is moving in a fairly uniform flow.

As the second plastic coating material reaches the upstream end of second flow deflector 5, the second Plastic coating material encounters the second concentric ring adjustment assembly which has been adjusted so as to create a uniform, concentric, consistent thickness flow of second plastic coating material, as described herein. If it is determined that the second layer coating is not concentric, that is, does not have a uniform radial wall thickness, the second concentric ring adjustment mechanism is adjusted relative to the central axis of the cross head 10 by means of second adjustment bolts 7. For example, if the lower quadrant wall thickness of the second coating is thicker than the upper three quadrants of the second layer coating, the lowermost second adjustment bolt or bolts 7 are manipulated such that second flow adjusting ring 16 is raised relative to the cross head 10 thus, in effect, squeezing or constricting the flow of second plastic coating material axially along the lower quadrant of second flow deflector 5, while allowing more of second plastic coating material to flow axially along the other three quadrants of second flow deflector 5. This adjustment results in a thinning of the second layer along the lowermost quadrant and a concomitent thickening of the second coating layer along the upper three quadrants. Therefore, when the flow of second plastic coating material reaches annular space 53 after passing the second concentric ring adjustment mechanism, it is generally concentric and of uniform thickness. When the second plastic coating material leaves the second layer annulizer space 55, it is deposited on the outside surface of the first layer, resulting in a dual coating.

Also concurrently, the third plastic coating material enters the cross head 10 in a molten state through third plastic entrance port 45 and travels through the first flow deflector 2 through third layer port 47 which is aligned with third plastic entrance port 45. The first flow deflector 2 is maintained in position such that third layer port 47 is aligned with third plastic entrance port 45 by means of aligning pin 15. The third plastic coating material encounters the outer perimetal surface of the upstream portion of tip 40, which is configured so as to act as a third flow deflector similar to first flow deflector 2 and second flow deflector 5. When third plastic flow encounters the outer perimetal surface of the upstream portion of tip 40, it is diverted both in a direction circumferentially around tip 40 and in a downstream direction toward exit end 56. The outer perimetal surface of tip 40 equalizes the pressure of the flow of the third plastic coating material as it flows around the outer perimetal surface of tip 40 so that when the third plastic coating material reaches annular space 53, it is moving in a fairly uniform flow. As the third layer generally is the thinnest layer, no adjustment to the flow of the third plastic is necessary. However, an adjustment can be provided on the same principal as discussed above by providing a third concentric ring adjustment mechanism. The third layer encounters the first and second layers in an annular space 53. The third layer is applied inside of the first layer.

The three plastic layers, now in contact with each other, flow along the outer perimetal surface of the central portion and downstream portion of tip 40 between tip 40 and die 41. The layers exit the cross head 10 through exit end 56 where they are applied to the moving wire 54, resulting in a coated wire.

A sample of the coated wire is cut with the plastic layers on it and the layers are checked for concentricity. As discussed herein, if the wall thickness of any of the layers is not radially uniform, the flow adjustement mechanisms are adjusted so that the flow of the plastic coating materials entering the tip 40 and die 41 is such that concentric layers of plastic exiting the tip 40 and die 41 are concentric and uniform.

After initially adjusting the flow such that the layers are concentric and uniform, the cross head 10 can be run continuously and for different wires sizes by just changing the tip 40 and die 41 without having to adjust for the concentricity of the layers. Additionally, each of the layers can be a full tubular layer, one or more stripes, or any portion of a layer in between by using different flow deflector configurations, such as those shown in FIGS. 3 and 4. Each of these flow deflectors can be substituted easily into the cross head 10 without disrupting the flow adjustment mechanisms.

The apparatus can be used in many different configurations simply by changing the second flow deflector 5 as shown in FIG. 3. Similarly, by changing the tip design as shown in FIG. 4, one can apply a thin coating or a different number of color stripes on the inside of the tube or a color stripe between two layers by changing flow deflector 2 as shown in FIG. 9.

The invention is described for applying plastic layers on an electrical conductor in an apparatus commonly known as a Crosshead. The invention can be applied similarly to the Inline Heads as shown in FIG. 6 to extrude products like medical tubing, hoses and large pipes. Further, the apparatus is described by showing what is commonly known in the industry as Tubing Set Up, but it will work just the same for what is commonly known in the industry as Pressure Set Up in both In Line Heads and Crossheads.

The above detailed description of a preferred embodiment is given for illustrative purposes and not to limit the invention, and many equivalents and variations of the components and method of the invention may be contemplated by one skilled in the art without deviating from the scope of the invention as defined by the appended claims.

What is claimed is:

1. In an extrusion apparatus for continuously forming a sheath of plastic material comprising a main body, a die and tip assembly, and at least a first coating material introduction port, the improvement comprising at least a second coating material introduction port, a first coating material flow adjustment means, and a second coating material flow adjustment means, wherein said first coating material introduction port and said first coating material flow adjustment means comprising a first coating material section of said extrusion apparatus wherein said first coating material flow adjustment means is located downstream from said first coating material introduction port and upstream from said die and tip assembly;

said second coating material introduction port and said second coating material flow adjustment means comprising a second coating material section of said extrusion apparatus wherein said second coating material flow adjustment means is located downstream from said second coating material introduction port and upstream from said die and tip assembly; and said first and said second coating material flow adjustment means being located upstream from said second coating material introduction port relative to said tip and die assembly.

2. The improvement as claimed in claim 1, wherein said main body comprises an axial bore transversely oriented through said main body, said bore comprising said die and tip assembly.

3. The improvement as claimed in claim 2, wherein said first flow adjustment means comprises a generally cylindrical first flow adjusting ring generally concentric with said bore.

4. The improvement as claimed in claim 3, wherein said first flow adjusting ring is manipulable relative to the axis of said bore such that said first ring can be manipulated to be off-center relative to the axis of said bore.

5. The improvement as claimed in claim 4, wherein said first ring is manipulable by at least one first adjustment bolt.

6. The improvement as claimed in claim 1, wherein said main body comprises at least a first axial bore and a second axial bore transversely oriented through said main body, said second bore being located downstream from said first bore.

7. The improvement as claimed in claim 6, wherein said first adjustment means is located within said second bore, said first flow adjustment means comprising retaining means and a first flow adjusting ring, said retaining means being secured within said second bore and defining an extension of said first bore, said first flow adjusting ring being manipulably retained within said retaining means and having an inner surface generally co-extensive and cooperating with said first bore.

8. The improvement as claimed in claim 1, wherein said first flow adjustment means and said second flow adjustment means acts upon a first coating material and a second coating material, respectively, prior to said coating materials encountering said die and tip assembly.

9. The improvement as claimed in claim 8, wherein said main body comprises at least a first axial bore, a second axial bore, and a third axial bore transversely oriented through said main body, said second bore being located downstream from said first bore, and said third bore being located downstream from said second bore.

10. The improvement as claimed in claim 9, wherein said second flow adjustment means is located within said third bore, said second flow adjustment means comprising a second flow adjusting ring being manipulably retained within said third bore and having an inner surface generally co-extensive and cooperating with said third bore.

11. The improvement as claimed in claim 10, wherein said first flow adjustment means acts upon a flow of a first coating material and second flow adjustment means acts upon a flow of a second coating material, said first coating material being introduced to said extrusion apparatus upstream from said die and tip assembly and from said first flow adjustment means, said second coating material being introduced to said extrusion apparatus radially outward of and generally upstream from said die and tip assembly, and said second flow adjustment means located upstream relative to the position of said die and tip assembly within said extrusion apparatus from said second coating material introduction port.

12. The improvement as claimed in claim 1, further comprising a third coating material introduction port, wherein said third coating material introduction port is located between said first coating material introduction port and said second coating material introduction port prior to said die and tip assembly and prior to said first and second coating material flow adjustment means, said third coating material introduction port configured so as to allow the introduction of a third coating material flow to the tip portion of said die and tip assembly prior to the introduction of said first and said second coating materials to said die and tip assembly.

13. The improvement as claimed in claim 1, further comprising a first deflector means, wherein said first deflector means is configured so as to create a tubular flow of a first coating material prior to encountering said first flow adjustment means.

14. The improvement as claimed in claim 13, further comprising a second flow deflector means, wherein said first flow deflector means is configured so as to create a tubular flow of a first coating material prior to encountering said first flow adjustment means and said second flow deflector means is configured so as to create a tubular flow of a second coating material prior to encountering said second flow adjustment means.

15. The improvement as claimed in claim 12, wherein said tip is configured so as to create a tubular flow of a third coating material prior to reaching said die.

16. The improvement as claimed in claim 13, wherein said first flow deflector means is configured so as to create a striped flow of a first coating material.

17. The improvement as claimed in claim 14, wherein said second flow deflector means is configured to create a striped flow of a second coating material.

18. The improvement as claimed in claim 15, wherein said tip is configured so as to create a striped flow of a third coating material.

19. The improvement as claimed in claim 14, wherein said second flow deflector means is configured so as to block the entrance of a second coating material to said die and tip assembly.

20. The improvement as claimed in claim 15, wherein said tip is configured so as to block the flow of a third coating material to said die and tip assembly.

21. The improvement as claimed in claim 1, wherein said first flow adjustment means can be adjusted without altering the position of said die and tip assembly relative to said main body.

22. The improvement as claimed in claim 1, wherein said second flow adjustment means can be adjusted without altering the position of said die and tip assembly in relation to said main body.

23. A method for extruding multiple layers of material to form multiple layers of material, comprising the steps of:
(a) providing a first material in a molten state;
(b) forming said first molten material into a first generally tubular sheath;
(c) adjusting the concentricity of the wall thickness of said first sheath;
(d) introducing said concentric first sheath to a die and tip assembly;
(e) extruding said concentric first sheath;
(f) providing a second material in a molten state simultaneous to providing said first material;
(g) forming said second molten material into a second generally tubular sheath;
(h) adjusting the concentricity of the wall thickness of said second sheath;
(i) introducing said concentric second sheath to a die and tip assembly; and
(j) extruding said concentric second sheath over said concentric first sheath.

24. The method as claimed in claim 23, wherein said second layer is coated on said first layer prior to said first layer and said second layer being extruded.

25. The method as claimed in claim 23, wherein said first layer is coated on said second layer prior to said first layer and said second layer being extruded.

26. The method as claimed in claim 23, further comprising steps of:
(k) providing a third material in a molten state simultaneous to providing said first and second materials;
(l) forming said third material into a third coating layer;
(m) adjusting the concentricity of said third layer;
(n) introducing said third layer to a die and tip assembly; and
(o) extruding said third layer.

27. The method as claimed in claim 23, wherein said second material is formed in the configuration of at least one stripe to be applied to said first material.

28. The method as claimed in claim 25, wherein said second material is formed in the configuration of at least one stripe to be applied inside of said first layer.

29. The method as claimed in claim 23, further comprising the step of:
(l) coating said first layer on a substrate.

30. The method as claimed in claim 23, further comprising the step of:
(k) coating said first and second layers on a substate.

31. The method as claimed in claim 25, further comprising the step of:
(p) coating said first, second, and third layers on a substrate.

32. The method as claimed in claim 26, wherein said first material is formed in the configuration of at least one stripe to be applied in between said second layer and said third layer.

* * * * *